(12) United States Patent
Fuhr (10) Patent No.: US 12,065,552 B2
(45) Date of Patent: Aug. 20, 2024

(54) STAINABLE THERMOFORMABLE SHEETS, COMPOSITIONS, AND METHODS OF MANUFACTURE

(71) Applicant: PRESSING DEVELOPMENTS, L.L.C., Georgetown, TX (US)

(72) Inventor: Adam Curtis Fuhr, Georgetown, TX (US)

(73) Assignee: Pressing Developments, L.L.C., Georgetown, TX (US)

( * ) Notice: Subject to any disclaimer, the term of this patent is extended or adjusted under 35 U.S.C. 154(b) by 0 days.

(21) Appl. No.: 17/602,741

(22) PCT Filed: Apr. 11, 2020

(86) PCT No.: PCT/US2020/027853
§ 371 (c)(1),
(2) Date: Oct. 8, 2021

(87) PCT Pub. No.: WO2020/210765
PCT Pub. Date: Oct. 15, 2020

(65) Prior Publication Data
US 2022/0195135 A1    Jun. 23, 2022

Related U.S. Application Data

(60) Provisional application No. 62/832,802, filed on Apr. 11, 2019.

(51) Int. Cl.
*C09D 7/40* (2018.01)
*B05D 5/06* (2006.01)
(Continued)

(52) U.S. Cl.
CPC .............. *C08J 7/042* (2013.01); *B05D 5/061* (2013.01); *B05D 7/53* (2013.01); *B32B 7/12* (2013.01); *B32B 25/18* (2013.01); *B32B 27/304* (2013.01); *B32B 27/36* (2013.01); *B32B 29/002* (2013.01); *C08J 5/18* (2013.01); *C08J 7/0427* (2020.01); *C09D 4/00* (2013.01); *C09D 7/61* (2018.01); *C09D 7/68* (2018.01); *C09D 7/69* (2018.01); *C09D 133/04* (2013.01);
(Continued)

(58) Field of Classification Search
None
See application file for complete search history.

(56) References Cited

U.S. PATENT DOCUMENTS 6,733,870 B2    5/2004    Enlow et al.
6,767,980 B2    7/2004    Yurugi et al.
(Continued)

FOREIGN PATENT DOCUMENTS

WO    2017/115202 A1    7/2017

*Primary Examiner* — Laura C Powers
(74) *Attorney, Agent, or Firm* — Rodney J. Fuller; Scott H. Blackman; BOOTH UDALL FULLER, PLC (57) ABSTRACT

The present disclosure describes thermoformable sheets capable of retaining an absorbing stain, pigmented sealer or clear sealer. The unique resin binder formulations and products include porosity-promoting agents that result in the resin binder having a porous surface capable of being stained, while still having the favorable properties of traditional Thermofoil products. The methods of the invention produce a Thermofoil product that can be stained with a variety of stains and colorants after manufacturing to suit the individual builder's or homeowner's preference.

17 Claims, 8 Drawing Sheets

(51) Int. Cl.
  *B05D 7/00* (2006.01)
  *B32B 7/027* (2019.01)
  *B32B 7/12* (2006.01)
  *B32B 25/18* (2006.01)
  *B32B 27/30* (2006.01)
  *B32B 27/36* (2006.01)
  *B32B 29/00* (2006.01)
  *C08J 5/18* (2006.01)
  *C08J 7/04* (2020.01)
  *C09D 4/00* (2006.01)
  *C09D 7/61* (2018.01)
  *C09D 133/04* (2006.01)
  *C09D 163/10* (2006.01)
  *C09D 167/06* (2006.01)
  *C09D 175/14* (2006.01)
  *C08K 3/26* (2006.01)

(52) U.S. Cl.
  CPC ......... *C09D 163/10* (2013.01); *C09D 167/06* (2013.01); *C09D 175/14* (2013.01); *B32B 7/027* (2019.01); *B32B 2250/02* (2013.01); *B32B 2255/10* (2013.01); *B32B 2255/12* (2013.01); *B32B 2255/26* (2013.01); *B32B 2255/28* (2013.01); *B32B 2307/4026* (2013.01); *B32B 2307/72* (2013.01); *B32B 2307/732* (2013.01); *B32B 2307/738* (2013.01); *B32B 2479/00* (2013.01); *C08J 2301/02* (2013.01); *C08J 2327/06* (2013.01); *C08J 2353/02* (2013.01); *C08J 2367/02* (2013.01); *C08J 2433/04* (2013.01); *C08J 2461/24* (2013.01); *C08J 2461/28* (2013.01); *C08J 2463/10* (2013.01); *C08J 2467/06* (2013.01); *C08J 2475/14* (2013.01); *C08K 2003/265* (2013.01); *C08K 2201/005* (2013.01)

(56) References Cited

U.S. PATENT DOCUMENTS

2012/0015176 A1 1/2012 Riebel et al.
2018/0043655 A1 2/2018 Fuhr

STAINABLE THERMOFORMABLE SHEETS, COMPOSITIONS, AND METHODS OF MANUFACTURE

CROSS-REFERENCE TO RELATED APPLICATIONS

This application is the U.S. National Stage of International Application No. PCT/US2020/027853, filed Apr. 11, 2020, which claims priority to U.S. Provisional Application No. 62/832,802, filed Apr. 11, 2019, the contents of each of which are incorporated herein by reference in their entireties.

TECHNICAL FIELD

This disclosure relates to stainable thermoformable sheets, resin binder formulations, and methods of manufacturing stainable thermoformable sheets. The methods disclosed herein provide a thermoformable sheet capable of being stained, including with typical absorbing stains, pigmented sealers or clear sealers.

BACKGROUND

Thermofoil is an inexpensive alternative to wood. In general, Thermofoil is a plastic, vinyl, polyethylene terephthalate (PET), or paper substrate that has been printed with either wood grain or a synthetic wood grain print. Thermofoil is in high production throughout the world because it simulates wood but uses resource alternative to wood.

Conventionally, Thermofoil is produced, for example, by extruding a PVC or ABS onto a thin continuous sheet of about 10 mm to 2500 mm wide and then wound onto a roll for secondary processing. Once the PVC or ABS has been successfully extruded and rolled, the roll is loaded onto a machine to unroll to pretreat for adhesion and color uniformity. Ink is applied through, for example, a rotogravure printing using UV-cured, solvent-based, or water-based inks or through a high-speed digital printing using UV-cured inks. After the substrate has been printed with the wood grain or synthetic wood grain print, the product is then coated with one or more UV-cured topcoats for final properties to finalize the product. Once the foil has all of the layers completed, the product can be embossed for a grain texture or simply re-wound onto a roll and cut to size per customer specifications. The resulting product simulates wood, is water resistant, and has various sheens and ranges in durability. The final products include edge banging, wrapped moldings, furniture components, cabinet components, or completed cabinet doors through various gluing processes.

While the existing process provides some flexibility for the customer, the minimum orders for custom products or colors are very large. Also, the global production quality of Thermofoil products is inconsistent. Accordingly, there is a need for manufacturing Thermofoil products that are capable of being stained any color, for example, with absorbing stains, pigmented sealers or clear sealers as well as finished with a professional, high-quality coating to provide a much better look and increased durability of the overall surface. The products and methods disclosed herein would reduce manufacturing and consumer costs and provide greater flexibility for the consumer.

BRIEF SUMMARY OF THE INVENTION

The invention relates to a stainable thermoformable sheet. The stainable thermoformable sheet comprises: a Thermofoil sheet; and a stainable topcoat layer affixed to the Thermofoil sheet. The stainable topcoat layer comprises a resin binder formulation comprising resins, an additive, and a porosity agent, before curing. The stainable topcoat layer preferably has at least 35 weight percent of a porosity agent, before curing. In nonlimiting embodiments, the Thermofoil sheet is a polyvinyl chloride (PVC) sheet, an acrylonitrile butadiene styrene (ABS) sheet, or a polyethylene terephthalate (PET) sheet.

The invention is also directed to a method of manufacturing a stainable thermoformable sheet. The method comprises the steps of applying to a Thermofoil sheet a stainable topcoat layer having a resin binder formulation comprising resins, an additive, and a porosity agent, before curing. In preferred embodiment the stainable topcoat layer has at least 35 weight percent of a porosity agent, before curing. The particle size of the porosity agent in one particular nonlimiting embodiment is 0.4-70 μm.

BRIEF DESCRIPTION OF THE DRAWINGS

Implementations will hereinafter be described in conjunction with the appended drawings, where like designations denote like elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Definitions

The verb "comprise" as is used in this description and the claims and its conjugations are used in its non-limiting sense to mean that items following the word are included, but items not specifically mentioned are not excluded.

Reference to an element by the indefinite article "a" or "an" does not exclude the possibility that more than one of the elements are present unless the context clearly requires that there is one and only one of the elements. The indefinite article "a" or "an" thus usually means "at least one." For example, "a" or "the" porosity agent refers to one porosity agent or a combination of porosity agents.

As used herein, the term "about" refers to plus or minus a tolerance that is 20% (e.g., "about 1" refers to 0.8-1.2, and "about 5" refers 4-6).

As used herein, the term "thermoformable sheet" or "Thermofoil" or "Thermofoil sheet" refers to a plastic or paper material which is capable of being thermoformed or affixed to the profile of an underlying substrate (e.g., an engineered wood core such as medium-density fiberboard) to produce a surface finish. A Thermofoil material does not have to be provided in the form of a sheet, but a Thermofoil material is typically provided as a sheet. A "stainable thermoformable sheet" or "stainable Thermofoil sheet" refers to a Thermofoil sheet with a stainable topcoat layer affixed thereto.

As used herein, the term "stainable" refers to an ability of the surface of a material to have absorption characteristics that allow a pigment or dye to penetrate which creates a "stain" effect.

As used herein, the term "absorbing stains" refers to a colorant, e.g., one or more dyes and/or pigments, suspended or dissolved in an agent or solvent. Non-limiting examples include an oil stain, varnish stain, water-based stain, solvent-based stain, gel stain, lacquer stain, water-soluble dye stain, ultra-violet (UV) light cured colorant, and metal or complex (metalized) dye stain, etc. Non-limiting examples of UV-cured colorant include sealants (e.g., pigmented sealers), stains, etc. Similar stains or colorants now existing or yet to be discovered may also be used.

As used herein, the term "resin" refers to a solid or highly viscous substance of plant or synthetic origin that is typically convertible into polymers.

As used herein, the term "topcoat" or "topcoat layer" or "stainable topcoat" or "stainable topcoat layer" or "resin binder layer" refers to a layer of resins and compositions overlaying an interior layer of a Thermofoil material or sheet. The topcoat is used to give a uniform, smooth or textured, durable, aesthetically appealing, and stainable finish.

As used herein, the term "pigment volume concentration" or "PVC" refers to the volume percentage of solid particles in the system after film formation. The calculation is as follows: the volume of the porosity agent divided by the volume of the porosity agent plus the resin volume solids. "Pigment volume concentration" determines if there is enough mineral in the resin system to actually realize the absorbency of the minerals in the final surface.

As used herein, the term "additive" refers to compounds that make the product flow, level, dilute, reduce, react, and/or defoam, e.g., a deaerator, a dispersant, a catalyst, a photoinitiator, a wetting agent, and, etc. Accordingly, additives include surface modifiers, curing agents, and the like.

As used herein, the term "photoinitiator" refers to a compound that can transform the physical energy of light into suitable chemical energy in the form of reactive intermediates. On absorption of light, a photoinitiator undergoes a photoreaction and produces reactive species which initiate or catalyze chemical reactions that result in significant changes in the solubility and physical properties of suitable formulations.

The present disclosure relates to the discovery that certain porosity-promoting surface agents included in a formulation of a resin binder (e.g., epoxy acrylates or acrylics) applied to a thermoformable sheet result in the resin binder treated thermoformable sheet having a porous surface that is capable of absorbing stains, pigmented sealers or clear sealers after being manufactured. The absorption of the stainable topcoat layer can be controlled by the process of adding finely ground minerals in high concentrations into the stainable (e.g., UV-cured or air-cured) coating. By allowing the base designs to be altered after the production process, e.g., the resulting surface to absorbing stains, pigments, or clear sealers after a thermoformable sheet adheres to a cabinet door or a furniture component, etc., the present disclosure creates even more flexibility and end product control by the customer. Additional benefits include reduced cost and greatly increased water resistance compared to the wood counterpart.

In a first aspect of the present invention, there is provided a stainable thermoformable sheet comprising a Thermofoil sheet and a stainable topcoat layer affixed to the Thermofoil sheet, wherein the stainable topcoat layer comprises a resin binder formulation comprising resins, an additive, and at least 35 weight percent of a porosity agent, before curing.

In a second aspect of the present invention, there is provided a method of manufacturing a stainable thermoformable sheet, comprising applying to the Thermofoil sheet a stainable topcoat layer comprising a resin binder formulation comprising resins, an additive, and at least 35 weight percent of a porosity agent, before curing.

In certain aspects, the stainable topcoat layer is pliable and wrappable and allows varying surface effects for staining.

A stainable thermoformable sheet is formed by adding at least one porosity agent 150 and at least one additive to a resin binder layer 120 before curing the resin binder layer 120. Existing formulations of energy-curable resins may be used in the present disclosure to create stainable resin binder layers 120 by adding porosity agents 150 as disclosed herein.

The Thermoformable Sheet

Figure 1:
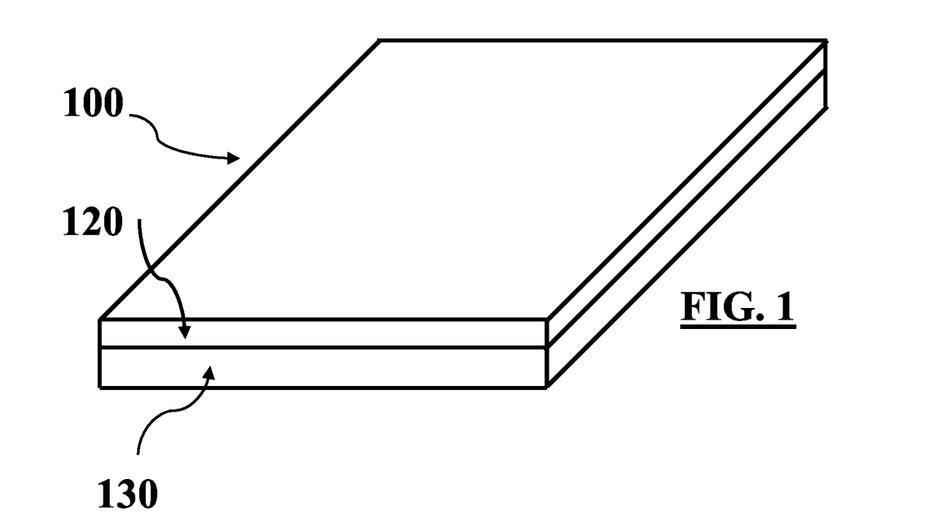
FIG. 1 depicts a non-limiting exemplary perspective view of a stainable Thermofoil sheet having one stainable topcoat layer.

In some non-limiting embodiments, the thermoformable sheet 130 (FIG. 1) is a polyvinyl chloride (PVC) sheet, an acrylonitrile butadiene styrene (ABS) sheet, a polyethylene terephthalate (PET) sheet, or a cellulose paper. In other embodiments, the thermoformable sheet 130 (FIG. 1) is a polyvinyl chloride (PVC) sheet, an acrylonitrile butadiene styrene (ABS) sheet, or a polyethylene terephthalate (PET) sheet. In one implementation, the thermoformable sheet 130 (FIG. 1) is not a cellulose paper. In one aspect, the thermoformable sheet 130 (FIG. 1) is a polyvinyl chloride (PVC) sheet. In another aspect, the thermoformable sheet 130 (FIG. 1) is an acrylonitrile butadiene styrene (ABS) sheet. In another aspect, the thermoformable sheet 130 (FIG. 1) is a polyethylene terephthalate (PET) sheet.

Thermoformable sheets made of PVC, ABS or PET are not capable of being saturated with a resin system (e.g., urea-formaldehyde resins or melamine formaldehyde resins) due to several factors: 1) Chemical compatibility is not present; 2) The PVC, ABS and PET sheets are not capable of withstanding the amount of heat and pressure used to create a laminate surface; and 3) The melamine resin systems can be adapted to have short term adhesion to the surface of PVC, ABS or PET sheets, but the resin system will lose adhesion over time due to the large differences in their modulus of elongation (i.e., the amount the substrate (PVC, ABS or PET) moves versus the amount the coating (melamine resin system) moves over time and tension). The last factor is of particular interest because the process of creating a Thermofoil sheet must allow the sheet to wrap around moulding, door center panels, and the like. The Thermofoil sheet must be pliable and wrappable. The coating system to apply must also have these characteristics. The present invention provides just such a coating system (i.e., a pliable, wrappable, and stainable topcoat layer) that is applied over the thermoformable sheet in contrast to other systems and methods that provide a stainable sheet that is saturated with or embedded in the resin system.

Impregnating a thermoformable sheet with the resin system functions differently than coating the thermoformable sheet with a resin system. When a resin system saturates a paper sheet, excellent bonding to the substrate as well as uniform stainability result. Having the resin system on the surface as provided by the present invention allows varying surface effects for staining. In other words, applying the resin system topically allows for more creative patterns for staining that cannot be achieved through the impregnated process.

Figure 2:
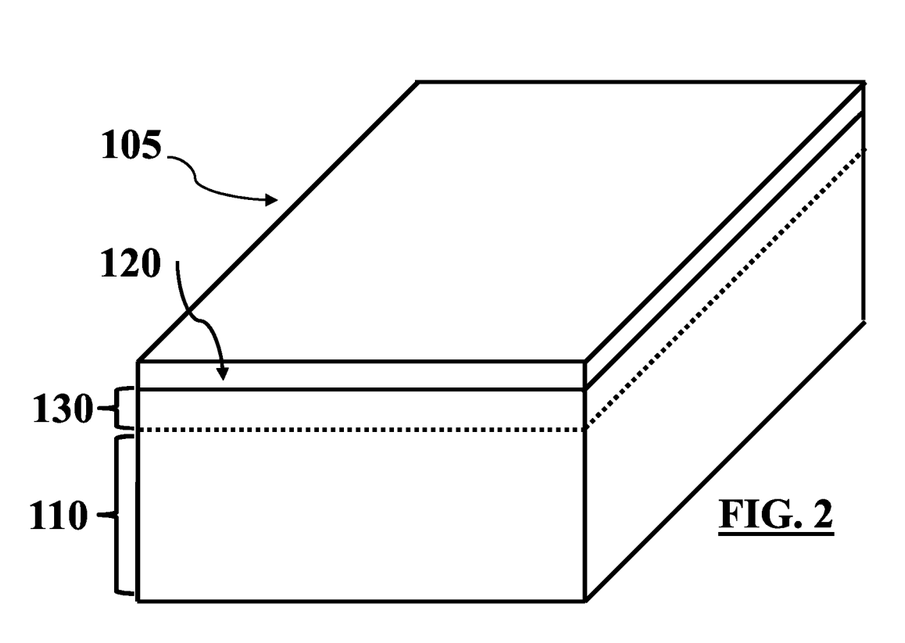
FIG. 2 depicts a non-limiting exemplary perspective view of a stainable Thermofoil product having one stainable topcoat layer.

In certain non-limiting implementations, the stainable thermoformable sheet 130 is thermoformed or affixed onto an underlying substrate 110 (FIG. 2). Non-limiting examples of the substrates 110 include edge banging, wrapped moldings, furniture components, cabinet components, or completed cabinet doors, etc. In these implementations, no additional sealers or topcoats are applied to the thermoformed sheet 130 before the application of the stainable topcoat layer 120.

Figure 5:
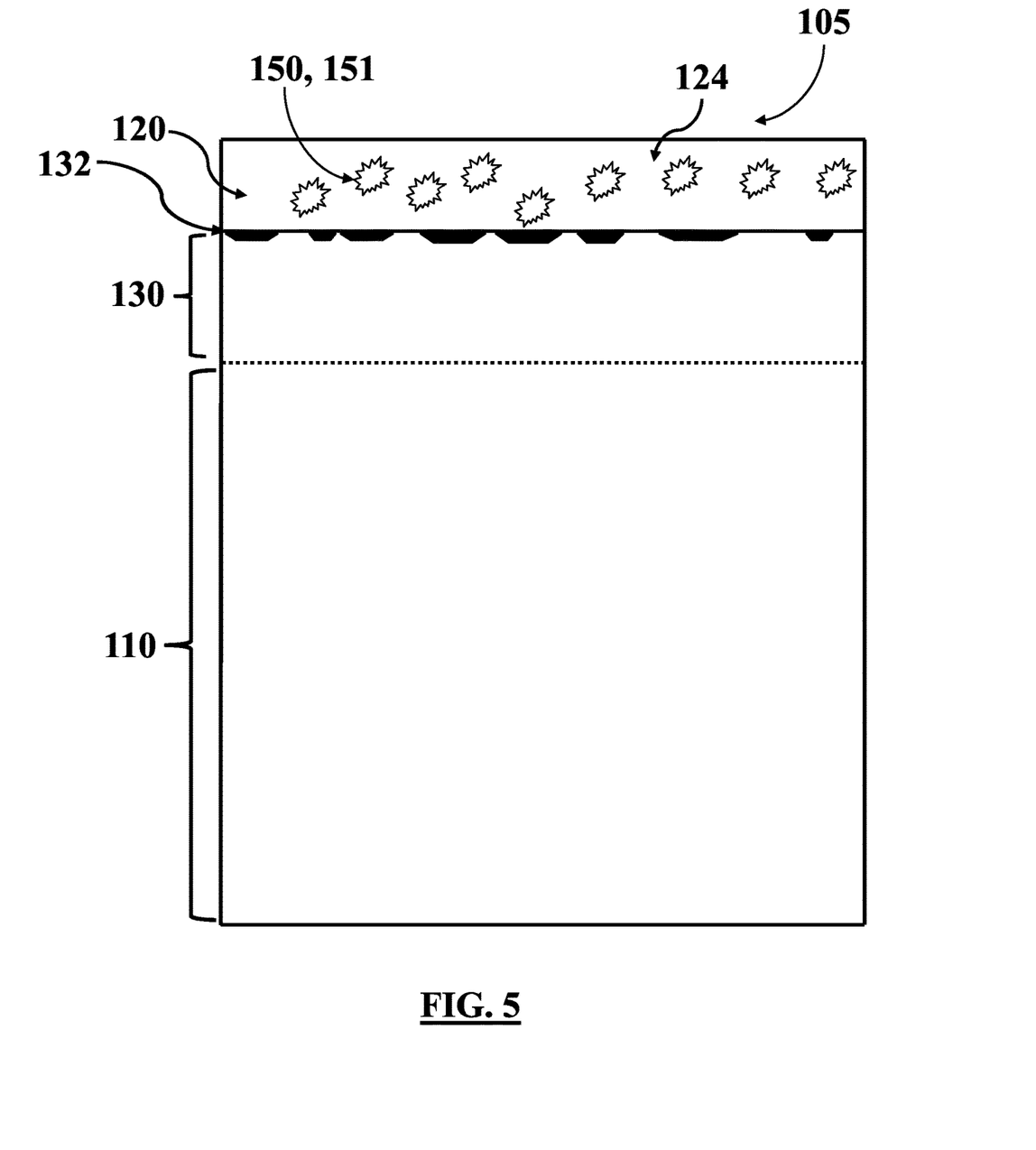
FIGS. 5-6 depict non-limiting exemplary cross-sectional views of stainable Thermofoil products having one stainable topcoat layer.
Figure 6:
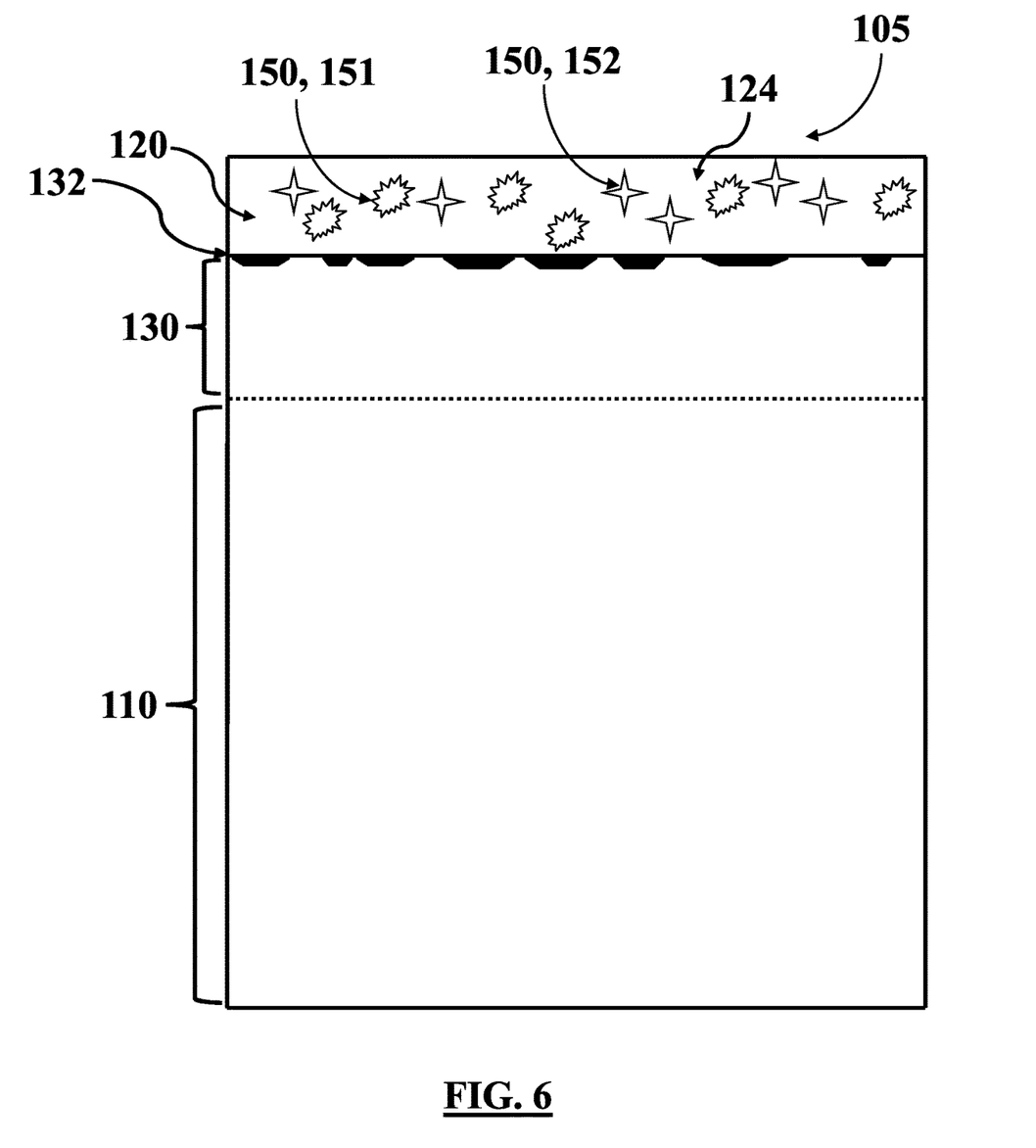
Figure 7:
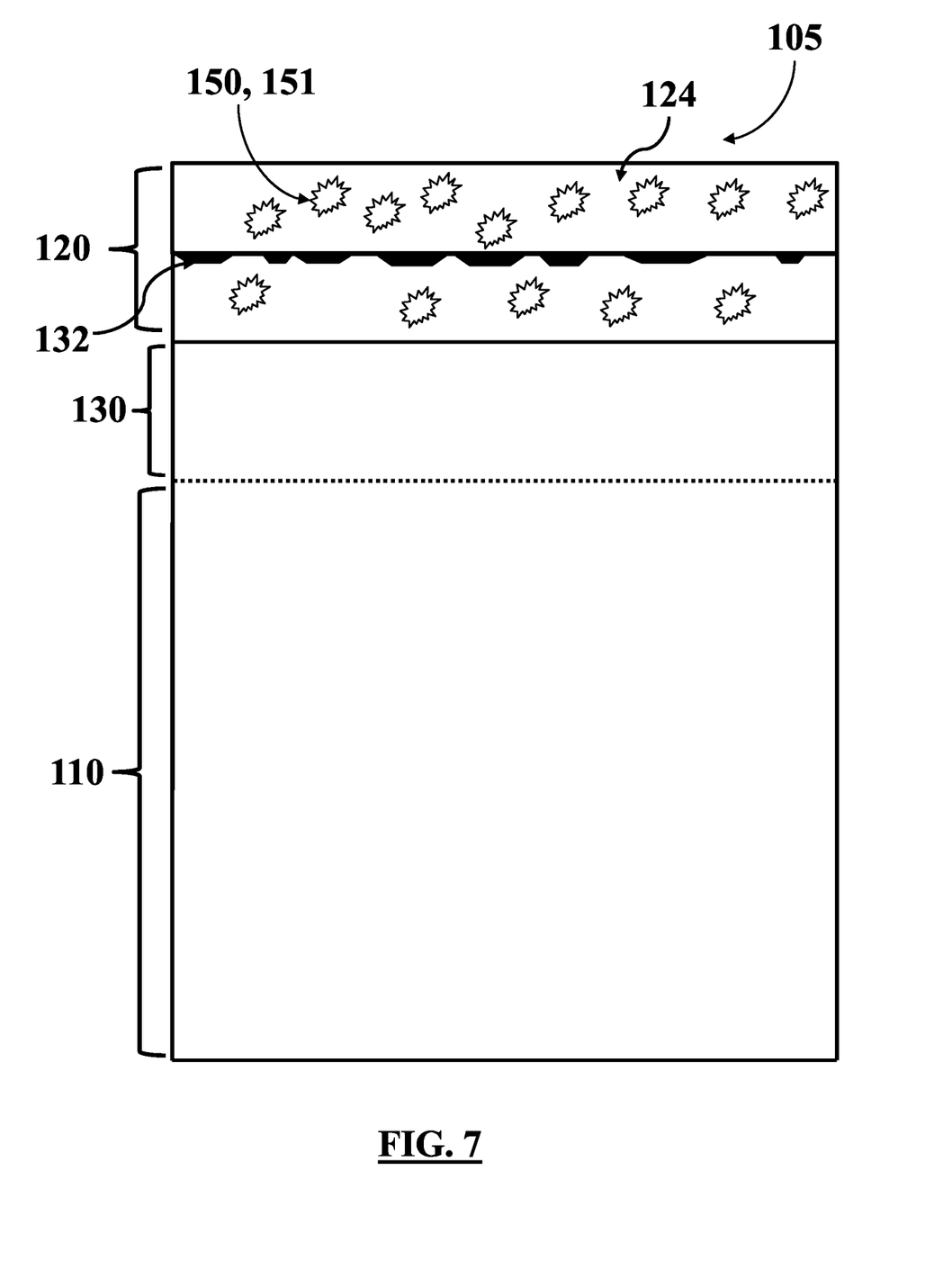
FIGS. 7-8 depict non-limiting exemplary cross-sectional views of stainable Thermofoil products having two stainable topcoat layers.
Figure 8:
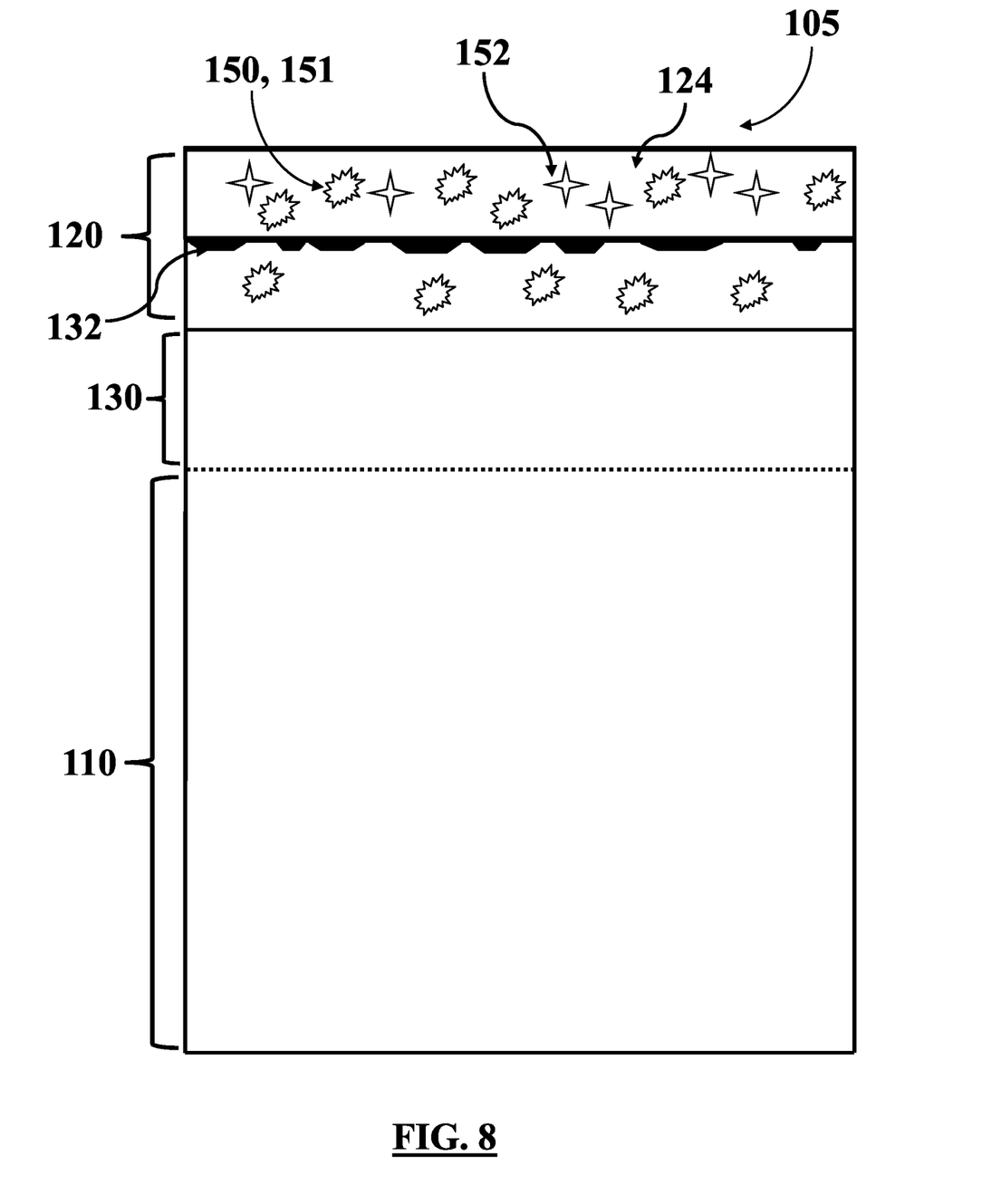

In non-limiting implementations of the first aspect, the stainable thermoformable sheet comprises a wood grain design 132 (FIG. 5).

In non-limiting implementations of the second aspect, the method further comprises producing a wood grain print onto the Thermofoil sheet using an ink selected from the group consisting of: a solvent reduced ink, water reduced ink, and UV curable ink before applying the stainable topcoat layer. In some implementations, the method further comprising applying a seal coating between producing the wood grain print and applying the stainable topcoat layer.

The Resin Binder Layer

In some non-limiting embodiments, the resin binder layer (total applied weight) is in an amount of between 5 and 190 grams per square meter (gsm) of the Thermofoil sheet per layer, or any number range in between, e.g., 5-175 gsm, 5-160 gsm, 5-145 gsm, 5-130 gsm, 5-115 gsm, 5-100 gsm, 5-85 gsm, 5-70 gsm, 10-190 gsm, 10-175 gsm, 10-160 gsm, 10-145 gsm, 10-130 gsm, 10-115 gsm, 10-100 gsm, 10-85 gsm, 10-70 gsm, 15-190 gsm, 15-175 gsm, 15-160 gsm, 15-145 gsm, 15-130 gsm, 15-115 gsm, 15-100 gsm, 15-85 gsm, 15-70 gsm, 20-190 gsm, 20-175 gsm, 20-160 gsm, 20-145 gsm, 20-130 gsm, 20-115 gsm, 20-100 gsm, 20-85 gsm, 20-70 gsm, 25-190 gsm, 25-175 gsm, 25-160 gsm, 25-145 gsm, 25-130 gsm, 25-115 gsm, 25-100 gsm, 25-85 gsm, and 25-70 gsm, etc.

The Resins

In some non-limiting embodiments, the resins are energy-curable resins. Non-limiting examples of energy-curable resins include ultraviolet (UV)-curable resins, electron beam (EB)-curable resins, or conventional heat source-curable (non-UV/EB) resins, etc. In these embodiments, the resin binder formulation comprises a photoinitiator.

In certain non-limiting embodiments, the resins require a catalyst to form a film (catalyzed system).

In other non-limiting embodiments, the resins form a film without the requirement of additional catalyzation (non-catalyzed system). In these embodiments, the resin binder formulation does not require a catalyst. In some non-limiting implementations, the non-catalyzed system forms a film through air drying due to a relatively low (e.g., lower than room temperature) glass transition temperature (Tg). In other non-limiting implementations, the non-catalyzed system uses solvents to decrease the Tg to allow the resin to form a film through evaporation.

In some non-limiting implementations, the energy-curable resins are selected from the group consisting of: urethane acrylates, polyester acrylates, epoxy acrylates, acrylics, and combinations thereof. In other non-limiting implementations, the energy-curable resins are selected from the group consisting of: epoxy acrylates, acrylics, and a combination thereof.

Epoxy acrylates are commercially available from manufacturers such as: Sartomer, BASF, or Miller-Stephenson, etc. Non-limiting examples of epoxy acrylates are described in greater detail, and hereby incorporated by reference in their entirety, in the following patents and references: U.S. Pat. Nos. 3,989,610; 4,472,019; 4,789,620; 5,086,088; 5,356,949; 6,844,034; EP Patent No. 1,295,900; and Chattopadhyay et al., *Thermal and mechanical properties of epoxy acrylate/methacrylates UV cured coatings*, Progress in Organic Coatings 54 (1), 2005; Habib et al., *UV Curable Heat Resistant Epoxy Acrylate Coatings*, Chemistry & Chemical Technology 4 (3), 2010; and Konuray et al., *State of the Art in Dual-Curing Acrylate Systems*, Polymers 10, 2018.

Acrylics are commercially available from manufacturers such as: Advanced Plastiform, Inc., etc. Non-limiting examples of acrylics are described in greater detail, and hereby incorporated by reference in their entirety, in the following patents: U.S. Pat. Nos. 5,242,968; 5,686,186; 7,252,786; China Patent No. 101044023; and Germany Patent No. DE 69725,422.

In some non-limiting implementations, before curing, the resin binder formulation comprises between 15 and 45 weight percent of the resins (e.g., epoxy acrylates or acrylics), or any percent range in between, e.g., 15-43%, 15-40%, 15-38%, 15-35%, 16-45%, 16-43%, 16-40%, 16-38%, 16-35%, 17-45%, 17-43%, 17-40%, 17-38%, 17-35%, 18-45%, 18-43%, 18-40%, 18-38%, 18-35%, 19-45%, 19-43%, 19-40%, 19-38%, 19-35%, 20-45%, 20-43%, 20-40%, 20-38%, or 20-35% of the resins, etc.

In certain non-limiting implementations, after curing, the resin binder formulation comprises between 5 and 45 weight percent of the resins (e.g., epoxy acrylates or acrylics), or any percent range in between, e.g., 5-40%, 5-35%, 5-30%, 5-25%, 6-45%, 6-40%, 6-35%, 6-30%, 6-25%, 7-45%, 7-40%, 7-35%, 7-30%, 7-25%, 8-45%, 8-40%, 8-35%, 8-30%, 8-25%, 9-45%, 9-40%, 9-35%, 9-30%, 9-25%, 10-45%, 10-40%, 10-35%, 10-30%, or 10-25% of the resins, etc.

The resin binder portion of the applied weight is between 2 and 100 gsm per resin binder layer of the Thermofoil sheet, or any number range in between, e.g., 2-95 gsm, 2-90 gsm, 2-85 gsm, 2-80 gsm, 2-75 gsm, 2-70 gsm, 2-65 gsm, 2-60 gsm 2-55 gsm, and 2-50 gsm, etc.

In other non-limiting implementations, the resin binder formulation further comprises urea-formaldehyde resins, melamine formaldehyde resins, or both.

The Porosity Agent

In some embodiments, the porosity agent comprises one or more mineral (e.g., two, three, four, etc.) to enable the thermoformable sheet to be stained.

In non-limiting embodiments, the particle size of the porosity agent 150 typically ranges from 0.4 µm to 80 µm, or any other number range in between, e.g., 0.4-70 µm, 0.5-70 µm, 0.5-60 µm, 0.6-60 µm, 0.6-50 µm, 0.7-50 µm, 0.7-40 µm, 0.8-40 µm, 0.8-30 µm, 0.9-30 µm, 0.9-20 µm, 0.9-15 µm, 0.4-60 µm, 0.4-45 µm, 0.4-30 µm, or 0.4-15 µm.

Figure 3:
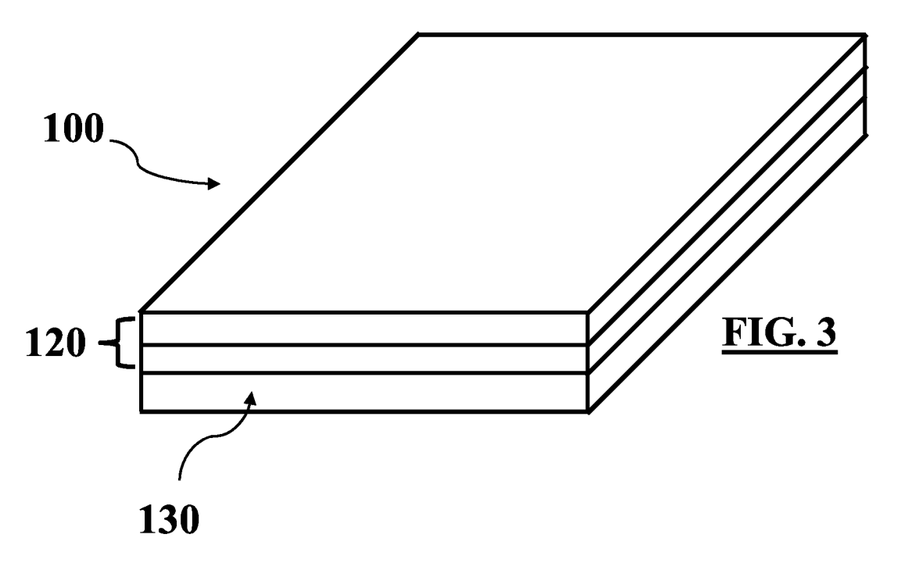
FIG. 3 depicts a non-limiting exemplary perspective view of a stainable Thermofoil sheet having two stainable topcoat layers.

In non-limiting embodiments, the density of the porosity agents 150 (FIGS. 3-4) typically ranges from 0.5 g/cm$^3$ to 4.5 g/cm$^3$, or any other number range in between, e.g., 0.5-4.2 g/cm$^3$, 0.6-4.2 g/cm$^3$, 0.6-4.0 g/cm$^3$, 0.7-4.0 g/cm$^3$, 0.7-3.8 g/cm$^3$, 0.8-3.8 g/cm$^3$, 0.8-3.6 g/cm$^3$, 0.9-3.6 g/cm$^3$, 0.9-3.5 g/cm$^3$, 1-3.5 g/cm$^3$, 1-3.4 g/cm$^3$, 1.1-3.4 g/cm$^3$, 1.1-3.3 g/cm$^3$, 1.1-3.2 g/cm$^3$, 1.2-3.2 g/cm$^3$, 1.4-3.2 g/cm$^3$, 1.4-3.1 g/cm$^3$, 1.6-3.1 g/cm$^3$, 1.6-3.0 g/cm$^3$, 1.8-3.0 g/cm$^3$, or 1.8 to 2.9 g/cm$^3$, etc.

Non-limiting examples of the porosity agents 150 include: calcium carbonate (e.g., precipitated calcium carbonate), crystalline silica (e.g., microcrystalline silica, silica, and silicate minerals), kaolin clay, talc; another mineral commonly used in the production of paint and coatings; another agent that result in a cured resin binder surface having porous characteristics that enable a stain to penetrate into the resin binder layer 120, or combinations thereof, etc. Silica includes untreated silica, treated silica, or both.

In some embodiments, at least one of the porosity agents 150 is selected from the group consisting of: calcium carbonate, kaolin clay, silica, and talc. In other embodiments, at least one of the porosity agents 150 is selected from the group consisting of: kaolin clay, silica, and talc. In yet other embodiments, the porosity agent 150 is selected from the group consisting of: kaolin clay and talc.

In other embodiments, the porosity agent 150 is calcium carbonate. In one aspect, the calcium carbonate is ground (natural) calcium carbonate (GCC). In another aspect, the particle size of the calcium carbonate is between about 0.5 µm and about 500 µm, between about 0.5 µm and about 400 µm, between about 0.5 µm and about 300 µm, between about 0.5 µm and about 200 µm, between about 0.5 µm and about 100 µm, between about 0.5 µm and about 90 µm, between about 0.5 µm and about 80 µm, between about 0.5 µm and about 70 µm, between about 0.5 µm and about 60 µm, between about 0.5 µm and about 50 µm, between about 0.5 µm and about 40 µm, between about 0.5 µm and about 30 µm, between about 0.5 µm and about 20 µm, or between about 0.5 µm and about 10 µm. In one aspect, the particle size of the calcium carbonate is between about 0.5 µm and about 100 µm. In another aspect, the particle size of the calcium carbonate is between about 0.5 µm and about 50 µm.

In one embodiment, the porosity agent 150 is not silica. In certain aspects, silica may have an adverse effect on the ability of the final surface to absorb stains.

In certain preferred implementations, the porosity agent 150 comprises kaolin clay, silica, and talc in the ratio of about 3 to 2 to 1 by weight (i.e., a formulation comprising 600 grams of mineral would comprise about 300 grams of kaolin clay, about 200 grams of silica, and about 100 grams of talc). In other preferred implementations, the porosity agent 150 comprises kaolin clay, silica, and talc in the ratio of about 2.5-3.5 to 1.5-2.5 to 1 by weight, or any ratio range in between, e.g., 2.6-3.4 to 1.6-2.4 to 1, 2.7-3.3 to 1.7-2.3 to 1, 2.8-3.2 to 1.8-2.2 to 1, 2.9-3.1 to 1.9-2.1 to 1, etc.

In non-limiting embodiments, the typical amount of the one or more porosity agents 150 per resin binder layer is at least 2 gsm of the Thermofoil sheet, e.g., at least 2.5 gsm, at least 3 gsm, at least 3.5 gsm, or at least 4 gsm of the Thermofoil sheet. In other non-limiting embodiments, the typical amount of the one or more porosity agents 150 per resin binder layer is between 2-100 grams per square meter (gsm) of the Thermofoil sheet, or any number range in between, for example, 3-70 gsm, 3-65 gsm, 3-60 gsm, 3-55 gsm, 3-50 gsm, 3-45 gsm, 3-40 gsm, 3-35 gsm, 3-30 gsm, 3-25 gsm, 3-20 gsm, 3.5-70 gsm, 3.5-65 gsm, 3.5-60 gsm, 3.5-55 gsm, 3.5-50 gsm, 3.5-45 gsm, 3.5-40 gsm, 3.5-35 gsm, 3.5-30 gsm, 3.5-25 gsm, 3.5-20 gsm, 4-70 gsm, 4-65 gsm, 4-60 gsm, 4-55 gsm, 4-50 gsm, 4-45 gsm, 4-40 gsm, 4-35 gsm, 4-30 gsm, 4-25 gsm, or 4-20 gsm, etc.

In non-limiting embodiments, the resin binder formulation 124 comprises at least 35 weight percent of the porosity agent, before curing, e.g., at least 40 weight percent, at least 45 weight percent, at least 50 weight percent, at least 55 weight percent, or at least 60 weight percent of the porosity agent, before curing.

In other non-limiting embodiments, the resin binder formulation 124 comprises between 30% and 70% of the porosity agent, before curing, or any percent range in between, e.g., 30% and 68%, 35-68%, 35-65%, 36-65%, 36-63%, 37-63%, 37-60%, 38-60%, or 40-60%, etc., before curing.

The pigment volume concentration (PVC) is very important in the overall functionality of the system to become absorbent. In non-limiting embodiments, the pigment volume concentration (PVC) is between 25%-80%, or any percent range in between, for example, 25%-70%, 25%-65%, 25%-60%, 25%-55%, 30%-80%, 30%-75%, 30%-70%, 30%-65%, 30%-60%, 30%-55%, 35%-80%, 35%-75%, 35%-70%, 35%-65%, 35%-60%, 35%-55%, 40%-80%, 40%-75%, 40%-70%, 40%-65%, 40%-60%, 45%-80%, 45%-75%, 45%-70%, 48%-80%, 48%-75%, or 48%-70%, etc.

The Additive

In some embodiments, the resin binder further comprises an additive, wherein at least one additive is selected from the group consisting of: a deaerator, a dispersant, a wetting agent, a photoinitiator, a catalyst, and combinations thereof.

In some implementations, before curing, the resin binder formulation comprises between 0.01 and 1 weight percent of the deaerator, or any percent range in between, for example, 0.01 and 0.9 weight percent, 0.01-0.8 weight percent, 0.01-0.7 weight percent, 0.01-0.6 weight percent, 0.01-0.5 weight percent, 0.015 and 1 weight percent, 0.015 and 0.9 weight percent, 0.015-0.8 weight percent, 0.015-0.7 weight percent, 0.015-0.6 weight percent, 0.015-0.5 weight percent, 0.02-1 weight percent, 0.02 and 0.9 weight percent, 0.02-0.8 weight percent, 0.02-0.7 weight percent, 0.02-0.6 weight percent, or 0.02-0.5 weight percent of the deaerator, etc.

In some implementations, before curing, the resin binder formulation comprises between 0.01 and 1 weight percent of the dispersant, or any percent range in between, for example, 0.01 and 0.9 weight percent, 0.01-0.8 weight percent, 0.01-0.7 weight percent, 0.01-0.6 weight percent, 0.01-0.5 weight percent, 0.015 and 1 weight percent, 0.015 and 0.9 weight percent, 0.015-0.8 weight percent, 0.015-0.7 weight percent, 0.015-0.6 weight percent, 0.015-0.5 weight percent, 0.02-1 weight percent, 0.02 and 0.9 weight percent, 0.02-0.8 weight percent, 0.02-0.7 weight percent, 0.02-0.6 weight percent, or 0.02-0.5 weight percent of the dispersant, etc.

In some implementations, the resins are ultraviolet (UV)-curable, electron beam (EB)-curable, or both, and the resin binder formulation comprises, before curing, between 0.4 and 5 weight percent of the photoinitiator, or any percent range in between, for example, 0.4-4.5 weight percent, 0.4-4 weight percent, 0.5-5 weight percent, 0.5-4.5 weight percent, 0.5-4 weight percent, 0.8-5 weight percent, 0.8-4.5 weight percent, 0.8-4 weight percent, 1-5 weight percent, 1-4.5 weight percent, 1-4 weight percent, 1.5-5 weight percent, 1.5-4.5 weight percent, 1.5-4 weight percent, 2-5 weight percent, 2-4.5 weight percent, or 2-4 weight percent of the photoinitiator, etc.

In other implementations, the resin binder formulation comprises, before curing, between 0.4 and 5 weight percent of the catalyst, or any percent range in between, for example, 0.4-4.5 weight percent, 0.4-4 weight percent, 0.5-5 weight percent, 0.5-4.5 weight percent, 0.5-4 weight percent, 0.8-5 weight percent, 0.8-4.5 weight percent, 0.8-4 weight percent, 1-5 weight percent, 1-4.5 weight percent, 1-4 weight percent, 1.5-5 weight percent, 1.5-4.5 weight percent, 1.5-4 weight percent, 2-5 weight percent, 2-4.5 weight percent, or 2-4 weight percent of the catalyst, etc.

In some non-limiting embodiments, the resin binder layer is between 90-100% cured, or any percent range in between, e.g., 90-99%, 90-98%, 90-97%, 90-96%, 92-100%, 92-99%, 92-98%, 92-97%, 92-96%, 94-100%, 94-99%, 94-98%, 94-97%, 94-96%, 95-100%, 95-99%, 95-98%, 95-97%, 95-96%, 100% cured, etc.

In some non-limiting embodiments, more than one stainable topcoat layers are affixed to the Thermofoil sheet. In these embodiments, the first stainable topcoat layer is the topmost layer, and the amount of the porosity agents is higher in the first stainable topcoat layer than the second stainable topcoat layer. In some non-limiting implementations, a pattern is applied to the first stainable topcoat layer using a printing cylinder, thus creating the pattern on the final surface, and no pattern is applied to the second stainable topcoat layer.

In some non-limiting implementations, the resin binder formulation of the first stainable topcoat layer comprises about 50 weight percent of a porosity agent, before curing. In other non-limiting implementations, the resin binder formulation of the first stainable topcoat layer comprises 40-60 weight percent of a first porosity agent, before curing, or any percentage number in between, e.g., 41-59%, 42-58%, 43-57%, 44-56%, or 45-55%, etc.

In some non-limiting implementations, the resin binder formulation of the second stainable topcoat layer comprises 15-40 weight percent of a second porosity agent, before curing, or any percentage number in between, e.g., 15-35%, 15-30%,15-25%, 20-40%, 20-35%, 20-30%, 25-40%, 25-35%, 25-30%, or 30-40%, etc.

Non-limiting examples of the first and/or the second porosity agents 150 include: calcium carbonate (e.g., precipitated calcium carbonate), crystalline silica (e.g., microcrystalline silica, silica, and silicate minerals), kaolin clay, talc; another mineral commonly used in the production of paint and coatings; another agent that result in a cured resin binder surface having porous characteristics that enable a stain to penetrate into the resin binder layer 120, or combinations thereof, etc. Silica includes untreated silica, treated silica, or both.

In some embodiments, at least one of the first and/or the second porosity agent 150 is selected from the group consisting of: calcium carbonate, kaolin clay, silica, and talc. In other embodiments, at least one of the first and/or the second porosity agent 150 is selected from the group consisting of: kaolin clay, silica, and talc. In yet other embodiments, the first and/or the second porosity agent 150 is selected from the group consisting of: kaolin clay and talc.

In some non-limiting embodiments, a stain is applied to the stainable thermoformable sheet. In further non-limiting embodiments, one or more additional coatings are applied after the stain. Non-limiting examples of the additional coatings applied after the stain include resins, and clear sealers, etc. (When a sealer is applied over the stainable topcoat layer, the thermoformable sheet is no longer stainable.)

The present invention is further illustrated by the Figures and Claims that should not be construed as limiting. The contents of all references, patents, and published patent applications cited throughout this application, as well as the Figures, are incorporated herein by reference in their entirety for all purposes.

EXAMPLES

Figure 4:
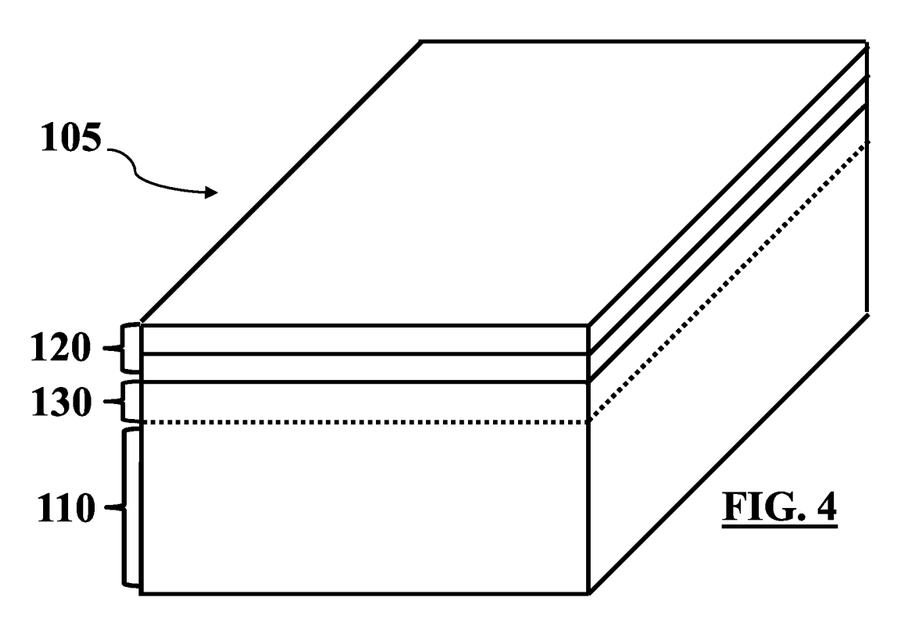
FIG. 4 depicts a non-limiting exemplary perspective view of a stainable Thermofoil product having two stainable topcoat layers.

FIGS. 2 and 4 depict non-limiting examples of the sustainable Thermofoil product 105. The exemplary stainable Thermofoil product 105 comprises a Thermofoil thermoformable) sheet 130 and one or more stainable resin binder layer for stainable topcoat layer) 120 applied to the surface of the Thermofoil sheet 130. In some non-limiting embodiments, there is one stainable resin binder layer 120 (FIG. 2). In other non-limiting embodiments, there are two stainable resin binder layers (FIG. 4). In yet other non-limiting embodiments, there are more than two stainable resin binder layers (not shown).

The stainable Thermofoil product 105 further comprises a substrate 110 (FIGS. 2 and 4). The Thermofoil sheet 130 is thermoformed or affixed onto the substrate 110 via, for example, heat melting glue. In numerous non-limiting embodiments, the Thermofoil sheet 130 is a polyvinyl chloride (PVC) sheet, an acrylonitrile butadiene styrene (ABS) sheet, a polyethylene terephthalate (PET) sheet, or a cellulose paper.

Prior to Applicant's disclosure, the "complete" Thermofoil products available on the market are intended to be finished products not designed to retain staining and/or clear finish. Stainable Thermofoil products, however, have open and porous surfaces capable of retain staining and/or clear finish. Without wishing to be bound by any particular theory, applying a resin binder layer 120 comprising minerals and additives to the Thermofoil during the production process creates the open and porous surfaces. Additionally, the porous surfaces physically harden, allowing the final layer to be sanded without impacting the underlying print.

The adhesion of the Thermofoil sheet 130 to the substrate 110 is based on heat melting glue that is applied to the back of the foil or by actually applying glue to the back of the foil and part to affix the foil to the substrate. Following application of the resin binder layer containing minerals to the surface of the Thermofoil, the foil can be formed around contoured surfaces and wrapped around surfaces that have been previously formed through molding and cutting. The stainable Thermofoil can be applied to the substrate in both heated and cold press processes.

FIGS. 5-8 depict non-limiting examples of the stainable resin binder layer 120. In some non-limiting embodiments, the stainable resin binder layer 120 includes only one porosity agent 150 (150, 151 in FIGS. 5 and 7). In other non-limiting embodiments, the stainable resin binder layer 120 includes two porosity agents 150 (150, 151 and 150, 152 in FIG. 6 and the first stainable topcoat layer of FIG. 8). In further non-limiting embodiments, the stainable resin binder layer 120 includes more than two porosity agents 150 (not shown). In some non-limiting embodiments, the resin binder layer 120 is the final, topmost layer. In other non-limiting embodiments, the resin binder layer 120 includes more than one layer.

In some embodiments, the stainable Thermofoil product 105 includes a stainable resin binder layer 120, and the stainable resin binder 120 is formed by applying to the surface of the Thermofoil sheet with an energy curable resin 124 that contains at least one porosity agent 150.

The stainable topcoat layer 120 comprises sufficient porosity agent 150 to allow for the absorption of both the energy curable resin 124 and the subsequent stain applied after curing. The thermoformable sheet 130 is a polyvinyl chloride (PVC) sheet, an acrylonitrile butadiene styrene (ABS) sheet, a polyethylene terephthalate (PET) sheet, or a cellulose paper. Due to their nature of being plastic, PVC and ABS sheets do not absorb the stain. While cellulose paper absorbs stain, it does not absorb evenly, causing the printed image on the surface of the paper to be distorted. Without wishing to be bound by any particular theory, when one or more porosity agents 150 (mineral additives) is added to the point of achieving the CPVC, the one or more porosity agents 150 will not be fully saturated by the resin. Consequently, after the stainable resin binder layer 120 is applied, the surface will remain "open," allowing stains to be absorbed. Because the amount and location of the absorption can be controlled by applying a stainable topcoat layer 120 comprising high-volume porosity agents 150 (e.g., based on printing one of the stainable topcoats), highly repeatable, yet realistic substrate can be created for the industry to use in mass production.

In some non-limiting implementations, a sealer that does not contain a porosity agent is applied below the stainable topcoat layer. As a result, the substrate would be sealed, and a stain would not be able to reach past the sealer to the Thermofoil sheet 130. In further non-limiting implementations, the stainable topcoat layer 120 is printed as a pattern onto the Thermofoil sheet 130.

The porosity agents 150 can contribute to creating a stainable Thermofoil product 105 in a number of different ways. The porosity agents 150 distributed throughout the resin binder layer 120 provide a path for a stain to seep into and ultimately reach the Thermofoil sheet 130. Additionally, the porosity agents 150 themselves can soak in stain and help add more of the stain color throughout the 25 resin binder layer 120. Experiments have shown that deep and even stain penetration often occurs when the pigment volume concentration of the porosity agent(s) 150 to the energy curable resin 124 reaches or exceeds the critical pigment volume concentration of the energy curable resin 124. The critical pigment volume concentration of the thermosetting polymer resin 124 often depends on the physical and chemical characteristics of the porosity agents 30 150 and how these characteristics interact with the energy curable resin 124. Thus, it is understood that the critical pigment volume concentration of the energy curable resin 124 will vary across different porosity agents 150.

Figure 9:
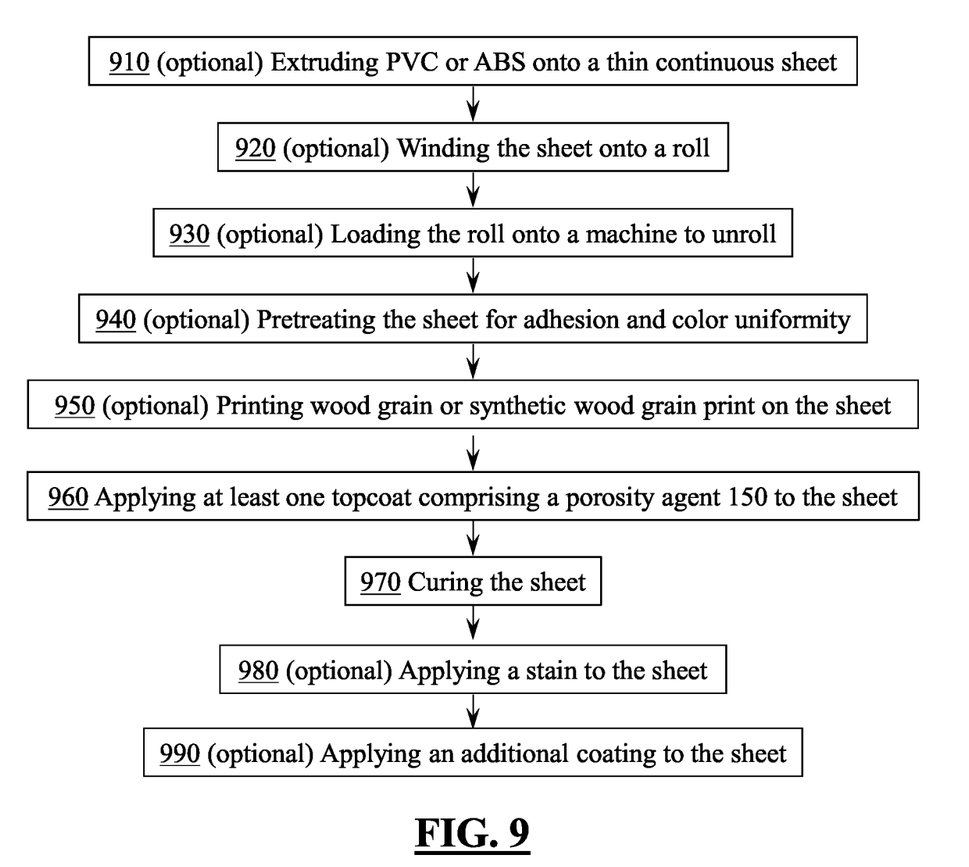
FIGS. 9-10 depict example processes of manufacturing a stainable Thermofoil product. Optional steps of the process are indicated.
Figure 10:
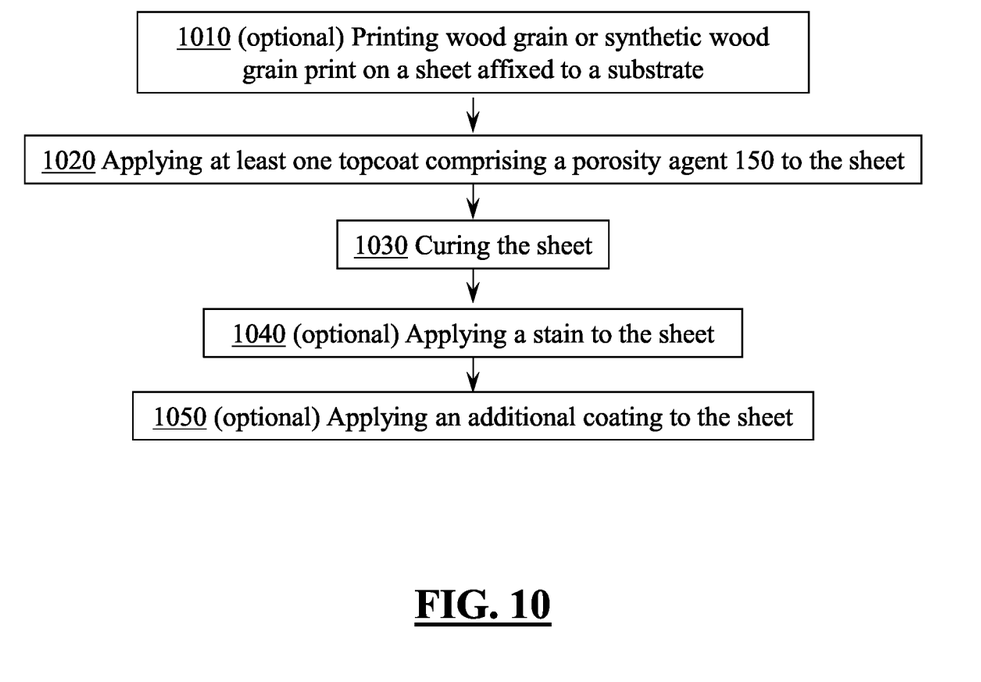

FIGS. 9-10 depict non-limiting examples of manufacturing the stainable Thermofoil product 105. In some non-limiting embodiments, the methods comprise applying to the surface of the Thermofoil sheet with a stainable topcoat layer comprising porosity agent 150 (960) followed by curing the Thermofoil sheet (970).

In other non-limiting embodiments, the process started with an extruding process, for example, extruding the PVC or ABS onto a thin continuous sheet (910). In some non-limiting implementations, the sheet is between 10 mm-2500 mm wide. The sheet is then wound onto a roll for secondary processing (920). Once the PVC or ABS has been successfully extruded and rolled, the roll is then loaded onto a machine to unroll (930) and pretreated for adhesion and color uniformity (940). Thereafter, ink is applied to the sheet (950). In certain non-limiting implementations, the ink is applied through either a rotogravure printing using UV-cured, solvent-based, or water-based inks. In other non-limiting implementations, the ink is applied with high-speed digital printing using UV cured inks. After printing with a wood grain or synthetic wood grain print, the product is then coated with one or more topcoats (960). In certain non-limiting implementations, a UV-cured topcoat or an air-cured topcoat is used. The sheet is then cured (970). Once the foil has all of the layers completed, the product can be embossed for a grain texture or simply re-wound onto a roll and cut to size per customer specifications.

In some non-limiting embodiments, the transformable sheet is transformed onto a substrate before the application of the stainable topcoat layer. See, e.g., FIG. 10.

What is claimed is:

1. A stainable thermoformable sheet, comprising:
    a Thermofoil sheet; and
    a stainable topcoat layer affixed to the Thermofoil sheet, wherein the stainable topcoat layer comprises a resin binder formulation comprising resins, an additive, and at least 35 weight percent of a porosity agent, before curing,
    wherein both the Thermofoil sheet and the stainable topcoat layer are pliable and wrappable and allow varying surface effects for staining,
    and wherein the Thermofoil sheet comprises a PVC, ABS, or PET sheet.

2. The stainable thermoformable sheet of claim 1, wherein the resin binder formulation comprises between 35 and 65 weight percent of the porosity agent, before curing.

3. The stainable thermoformable sheet of claim 1, wherein the resin binder formulation comprises between 38 and 60 weight percent of the porosity agent, before curing.

4. The stainable thermoformable sheet of claim 1, wherein the porosity agent per stainable topcoat layer is in an amount of between 3 and 60 grams per square meter (gsm) of the Thermofoil sheet.

5. The stainable thermoformable sheet of claim 1, wherein the porosity agent per stainable topcoat layer is in an amount of between 4 and 20 gsm of the Thermofoil sheet and the porosity agent comprises at least one mineral to enable the thermoformable sheet to be stained.

6. The stainable thermoformable sheet of claim 5, wherein the at least one mineral has a density of between 1.8 to 2.9 g/cm3; the at least one mineral has a typical size of between 0.9 and 15 μm; or both.

7. The stainable thermoformable sheet of claim 5, wherein at least one mineral is selected from the group consisting of: calcium carbonate, kaolin clay, silica, and talc.

8. The stainable thermoformable sheet of claim 7, wherein the at least one mineral consists of kaolin clay, silica, and talc at a weight ratio of about 3:2:1.

9. The stainable thermoformable sheet of claim 7, wherein the at least one mineral includes calcium carbonate with a particle size of between about 0.5 pm and about 100 pm; the resin binder formulation comprises a pigment volume concentration of between 30% and 80%.

10. The stainable thermoformable sheet of claim 9, wherein the Thermofoil sheet comprises a wood grain design.

11. The stainable thermoformable sheet of claim 1, wherein the resins are energy curable selected from the group consisting of ultraviolet (UV)-curable, electron beam (EB)-curable, conventional heat source (non-UV/EB) curable, or a combination thereof.

12. The stainable thermoformable sheet of claim 1, wherein the resins are selected from the group consisting of: urethane acrylates, polyester acrylates, epoxy acrylates, acrylics, and combinations thereof.

13. The stainable thermoformable sheet of claim 1 wherein the resin binder formulation comprises between 15 and 45 weight percent of the resins, before curing or the resin binder formulation comprises between 5 and 45 weight percent of the resins, after curing.

14. The stainable thermoformable sheet of claim 1, wherein the resin binder formulation further comprises urea-formaldehyde resins, melamine formaldehyde resins, or both; and the resin binder portion of the applied weight per stainable topcoat layer is in an amount of between 2 and 100 gsm of the Thermofoil sheet.

15. The stainable thermoformable sheet of claim 1, wherein the additive is selected from the group consisting of: a deaerator, a dispersant, a wetting agent, a photoinitiator, a catalyst, and combinations thereof.

16. The stainable thermoformable sheet of claim 1, wherein the stainable topcoat layer comprises a first stainable topcoat layer comprising a first resin binder formulation and a second stainable topcoat layer comprising a second resin binder formulation.

17. The stainable thermoformable sheet of claim 1, wherein the Thermofoil sheet is thermoformed or affixed to an underlying substrate before the application of the stainable topcoat layer.

\* \* \* \* \*

UNITED STATES PATENT AND TRADEMARK OFFICE
CERTIFICATE OF CORRECTION

PATENT NO. : 12,065,552 B2
APPLICATION NO. : 17/602741
DATED : August 20, 2024
INVENTOR(S) : Adam Curtis Fuhr Page 1 of 1

It is certified that error appears in the above-identified patent and that said Letters Patent is hereby corrected as shown below:

In the Claims

In Claim 6, Column 12, Line 43, 'g/cm3;' should read -- g/cm$^3$ --.

In Claim 9, Column 12, Line 53, 'about 0.5 pm and about 100 pm;' should read -- 0.5 μm and about 100 μm --.

Signed and Sealed this
Seventeenth Day of June, 2025

Coke Morgan Stewart
*Acting Director of the United States Patent and Trademark Office*